(12) United States Patent
Nelson

(10) Patent No.: US 11,287,021 B1
(45) Date of Patent: Mar. 29, 2022

(54) TWO-PASS TORQUE CONVERTER INCLUDING FLOW CONTROL ASSEMBLY WITH THROUGH-BORE

(71) Applicant: Schaeffler Technologies AG & Co. KG, Herzogenaurach (DE)

(72) Inventor: Kyle Nelson, Wadsworth, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/117,835

(22) Filed: Dec. 10, 2020

(51) Int. Cl.
*F16H 45/02* (2006.01)

(52) U.S. Cl.
CPC ..... *F16H 45/02* (2013.01); *F16H 2045/0205* (2013.01); *F16H 2045/0294* (2013.01)

(58) Field of Classification Search
CPC .......................... F16H 2045/0205–021; F16H 2045/0273–0294
See application file for complete search history.

(56) References Cited

U.S. PATENT DOCUMENTS

| | | | |
|---|---|---|---|
| 5,799,762 A * | 9/1998 | Hinkel | F16H 45/02 192/3.29 |
| 7,621,385 B2 * | 11/2009 | Sarnie | F16H 45/02 192/3.29 |
| 8,348,037 B2 * | 1/2013 | Carrier | F16H 45/02 192/3.3 |
| 8,839,923 B2 * | 9/2014 | Greathouse | F16H 45/02 192/3.29 |
| 2006/0207851 A1 * | 9/2006 | Heuler | F16H 45/02 192/3.3 |
| 2020/0284331 A1 | 9/2020 | Hoff et al. | |

* cited by examiner

*Primary Examiner* — Charles A Fox
*Assistant Examiner* — James J Taylor, II
(74) *Attorney, Agent, or Firm* — Volpe Koenig

(57) ABSTRACT

A torque converter, including: a cover arranged to receive a rotational torque; an impeller including an impeller shell connected to the cover; a turbine including a turbine shell; a lock-up clutch including a piston plate; an output element arranged to non-rotatably connect to an input shaft of a transmission; and a flow control assembly including a seal plate defining a through-bore. The cover, the flow control assembly, and the piston plate define, at least partly, a release pressure chamber. The cover, the impeller shell, the piston plate, and the flow control assembly define, at least partly, an apply pressure chamber. In a clutch closed mode of the two-pass torque converter: the lock-up clutch is arranged to transmit the rotational torque to the output element; and a fluid in the apply pressure chamber is arranged to flow through the through-bore and into the release pressure chamber.

18 Claims, 13 Drawing Sheets

TWO-PASS TORQUE CONVERTER INCLUDING FLOW CONTROL ASSEMBLY WITH THROUGH-BORE

TECHNICAL FIELD

The present disclosure relates to a two-pass torque converter with a flow control assembly for controlling flow of pressurized fluid between pressure chambers for a lock-up clutch.

BACKGROUND

For a lock-up clutch of a known two-pass torque converter, unregulated fluid flow between pressure chambers can hamper the transition from a release mode to an apply mode.

SUMMARY

According to aspects illustrated herein, there is provided a two-pass torque converter, including: a cover arranged to receive a rotational torque; an impeller including an impeller shell connected to the cover and at least one impeller blade fixedly connected to the impeller shell; a turbine including a turbine shell and at least one turbine blade fixedly connected to the turbine shell; a lock-up clutch including a piston plate; an output element arranged to non-rotatably connect to an input shaft of a transmission; and a flow control assembly including a seal plate defining a through-bore. The cover, the flow control assembly, and the piston plate define, at least partly, a release pressure chamber. The cover, the impeller shell, the piston plate, and the flow control assembly define, at least partly, an apply pressure chamber. In a clutch closed mode of the two-pass torque converter: the lock-up clutch is arranged to transmit the rotational torque to the output element; and a fluid in the apply pressure chamber is arranged to flow through the through-bore and into the release pressure chamber.

According to aspects illustrated herein, there is provided a two-pass torque converter, including: a cover arranged to receive rotational torque; an impeller including an impeller shell connected to the cove; and at least one impeller blade fixedly connected to the impeller shell; a turbine including a turbine shell and at least one turbine blade fixedly connected to the turbine shell; a lock-up clutch including a piston plate; an output element arranged to non-rotatably connect to an input shaft of a transmission; and a flow control assembly including: a seal plate defining a through-bore; and a first seal connected to the seal plate. The cover, the piston plate, and the flow control assembly define, at least partly, a release pressure chamber. The cover, the impeller shell, the piston plate, and the flow control assembly define, at least partly, an apply pressure chamber. In a clutch closed mode of the two-pass torque converter: the lock-up clutch is arranged to transmit the rotational torque to the output element; and a fluid in the apply pressure chamber is arranged to flow through the through-bore and into the release pressure chamber. In a clutch open mode: the impeller is arranged to transmit the rotational torque to the output element; a fluid in the release pressure chamber is arranged to flow through the through-bore and into the apply pressure chamber; and the fluid in the release pressure chamber is arranged to flow between the first seal and the cover and into the apply pressure chamber.

According to aspects illustrated herein, there is provided a method of operating a two-pass torque converter including a cover arranged to receive torque, an impeller including an impeller shell, a turbine, a lock-up clutch including a piston plate and friction material axially disposed between the cover and the piston plate, an output element, and a flow control assembly including a seal plate and a first seal connected to the seal plate, the seal plate defining a through-bore. The method includes: receiving, with the cover, a rotational torque; for a clutch open mode, urging the piston plate away from the cover with a fluid in a release pressure chamber, the release pressure chamber defined at least in part by the cover, the flow control assembly, and the piston plate, flowing the fluid in the release pressure chamber through the through-bore and into an apply pressure chamber, the apply pressure chamber defined at least in part by the cover, the impeller shell, the piston plate, and the flow control assembly, flowing the fluid, in the release pressure chamber, between the first seal and the cover and into the apply pressure chamber, and transmitting the rotational torque from the cover to the output element via the impeller and the turbine; and for a clutch closed mode, urging the piston plate toward the cover with a fluid in the apply pressure chamber, flowing the fluid in the apply pressure chamber through the through-bore and into the release pressure chamber, and transmitting the rotational torque from the cover to the output element via the lock-up clutch.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only and is not intended to limit the scope of the present disclosure.

Unless defined otherwise, all technical and scientific terms used herein have the same meaning as commonly understood to one of ordinary skill in the art to which this disclosure belongs. It should be understood that any methods, devices, or materials similar or equivalent to those described herein can be used in the practice or testing of the disclosure.

Figure 1:
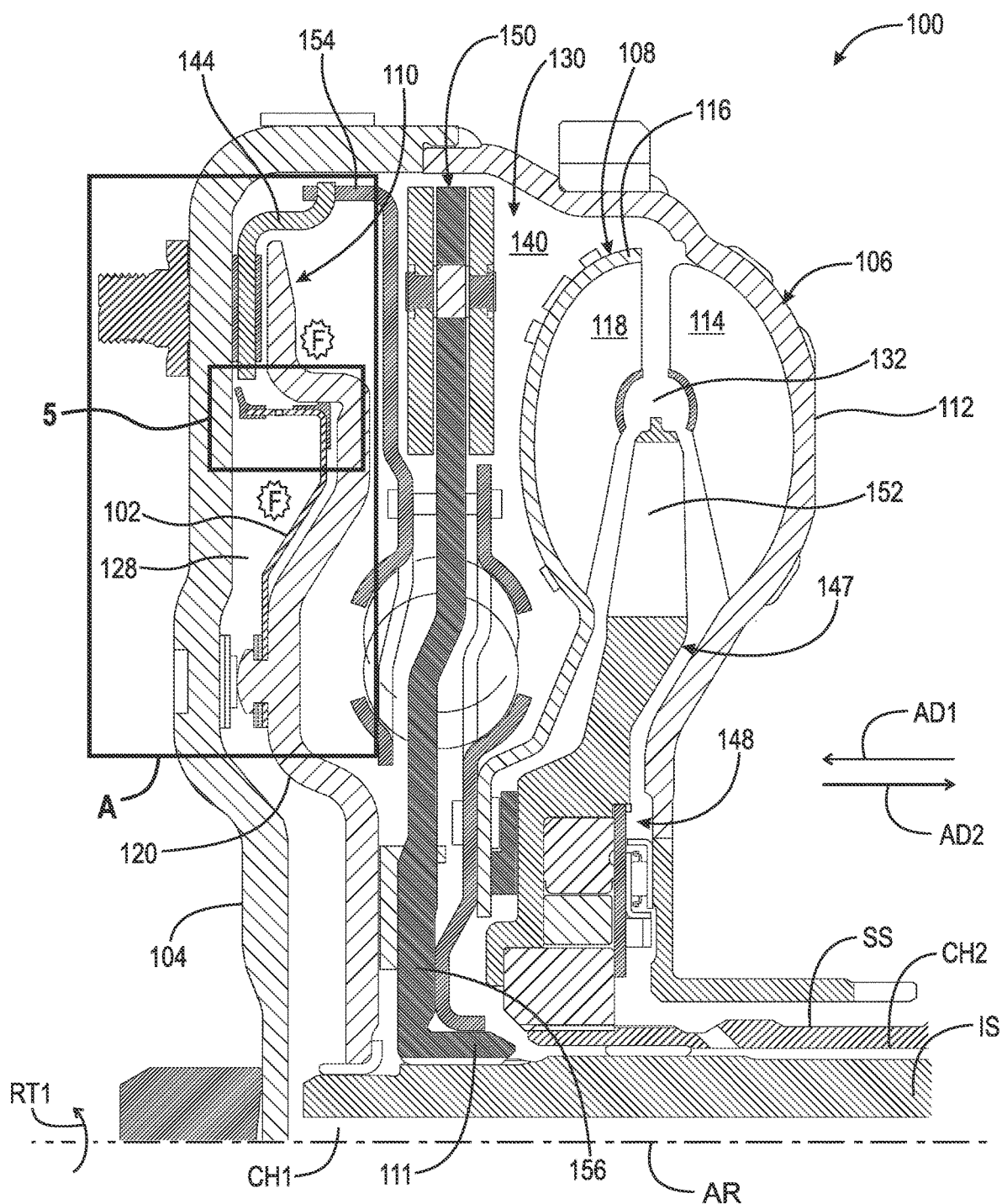
FIG. 1 is a partial cross-sectional view of a two-pass torque converter, with a flow control assembly, in a clutch open mode.

FIG. 1 is a partial cross-sectional view of two-pass torque converter 100, with flow control assembly 102, in a clutch open mode.

Figure 2:
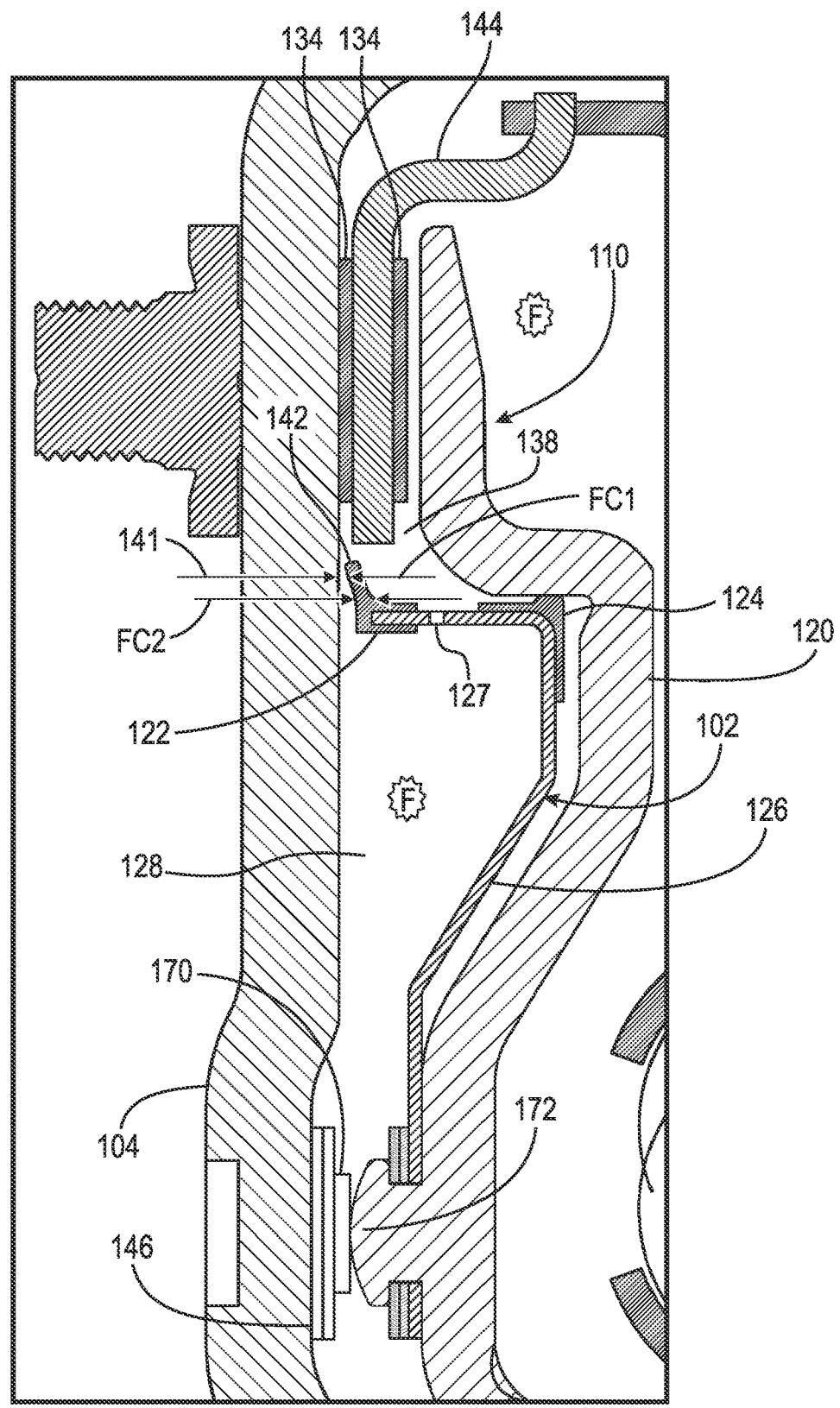
FIG. 2 is a detail of area A in FIG. 1.

FIG. 2 is a detail of area A in FIG. 1. The following should be viewed in light of FIGS. 1 and 2. Torque converter 100 includes: cover 104 arranged to receive rotational torque; impeller 106; turbine 108; lock-up clutch 110; and output element 111 arranged to non-rotatably connect to transmission input shaft IS. Impeller 106 includes: impeller shell 112 non-rotatably connected to cover 104; and at least one impeller blade 114 fixedly connected to impeller shell 112. Turbine 108 includes: turbine shell 116; and at least one turbine blade 118 fixedly connected to turbine shell 116. Lock-up clutch 110 includes piston plate 120. Flow control assembly 102 is axially disposed between cover 104 and piston plate 120 and includes: seal 122; seal 124; and seal plate 126. Seal 122 and seal 124 are connected to seal plate 126. Seal 122 and seal 124 are any resilient seal known in the art. In the example of FIG. 1, Seals 122 and 124 are fixedly connected to plate 126. Seal plate 126 defines through-bore 127 and is non-rotatably connected to piston plate 120. In an example embodiment, seal 122 and seal 124 are each circumferentially continuous. In an example embodiment, plate 126 is circumferentially continuous. In the example of FIG. 1, an entirety of seal 122 is off-set from the seal 124 in axial direction AD1, parallel to axis of rotation AR of two-pass torque converter 100. In an example embodiment, plate 126 is preloaded to urge seal 122 in axial direction AD1, parallel to axis AR.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs. Without a further modifier, the non-rotatable connection between or among components is assumed for rotation in any direction. However, the non-rotatable connection can be limited by use of a modifier. For example, "non-rotatably connected for rotation in circumferential direction CD1," defines the connection for rotation only in circumferential direction CD1.

Cover 104, flow control assembly 102, and piston plate 120 define, at least partly, release pressure chamber 128. Cover 104, impeller shell 112, piston plate 120, and flow control assembly 102 define, at least partly, apply pressure chamber 130. Flow control assembly 102 separates release pressure chamber 128 and apply pressure chamber 130. Flow control assembly 102 is arranged to control a flow of fluid F between release pressure chamber 128 and apply pressure chamber 130 in response to the pressure of fluid F in chamber 128 and the pressure of fluid F in chamber 130, for example, in response to a difference between the pressure of fluid F in chamber 128 and the pressure of fluid F in chamber 130.

In the clutch open mode of two-pass torque converter 100: cover 104 is arranged to transmit torque RT to output element 111 via impeller 106 and turbine 108; and the pressure of fluid F in release pressure chamber 128 is greater than the pressure of fluid F in apply pressure chamber 130. The pressure differential between release pressure chamber 128 and apply pressure chamber 130 holds clutch 110 open.

Figure 3:
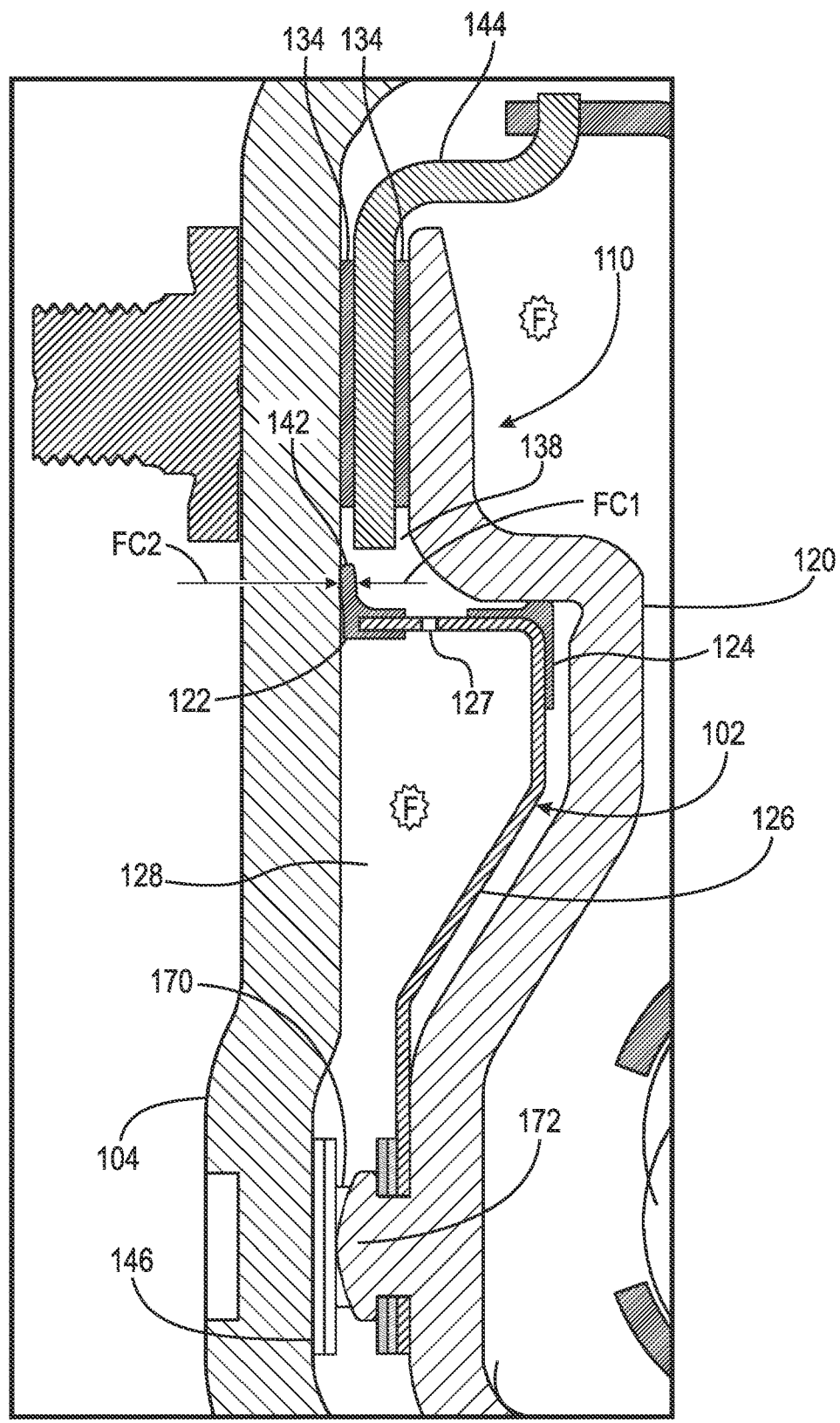
FIG. 3 is a detail of area A with the two-pass torque converter in a clutch closed mode.

FIG. 3 is a detail of area A in FIG. 1 with two-pass torque converter 100 in a clutch closed mode. The following should be viewed in light of FIGS. 1 through 3. In the clutch closed mode of two-pass torque converter 100: cover 104 is arranged to transmit torque RT to output element 111 via lock-up clutch 110; and the pressure of fluid F in release pressure chamber 128 is less than the pressure of fluid F in apply pressure chamber 130, which clamps clutch 110 closed.

In the clutch open mode, fluid F is arranged to flow into release pressure chamber 128, past and through flow control assembly 102, and into apply pressure chamber 130 to provide cooling for torus 132 formed by impeller 106 and turbine 108. In the clutch open mode: fluid F is arranged to flow into release pressure chamber 128; through through-bore 127 and into apply pressure chamber 130; and between seal 122 and cover 104 into apply pressure chamber 130. In the clutch open mode, seal 124 is arranged to seal against piston plate 120 to block flow of fluid F from release pressure chamber 128, between piston plate 120 and seal 124, and into apply pressure chamber 130.

In the clutch closed mode, fluid F is arranged to flow into apply pressure chamber 130, through flow control assembly 102, and into release pressure chamber 128 to provide cooling of clutch 110. In the clutch closed mode: fluid F is arranged to flow into apply pressure chamber 130, through through-bore 127, and into release pressure chamber 128; seal 122 is arranged to seal against cover 104 to prevent flow of fluid F from apply pressure chamber 130, between seal 122 and cover 104 and into release pressure chamber 128; and seal 124 is arranged to seal against piston plate 120 to prevent flow of fluid F from apply pressure chamber 130, between seal 124 and piston plate 120 and into release pressure chamber 128.

Figure 4:
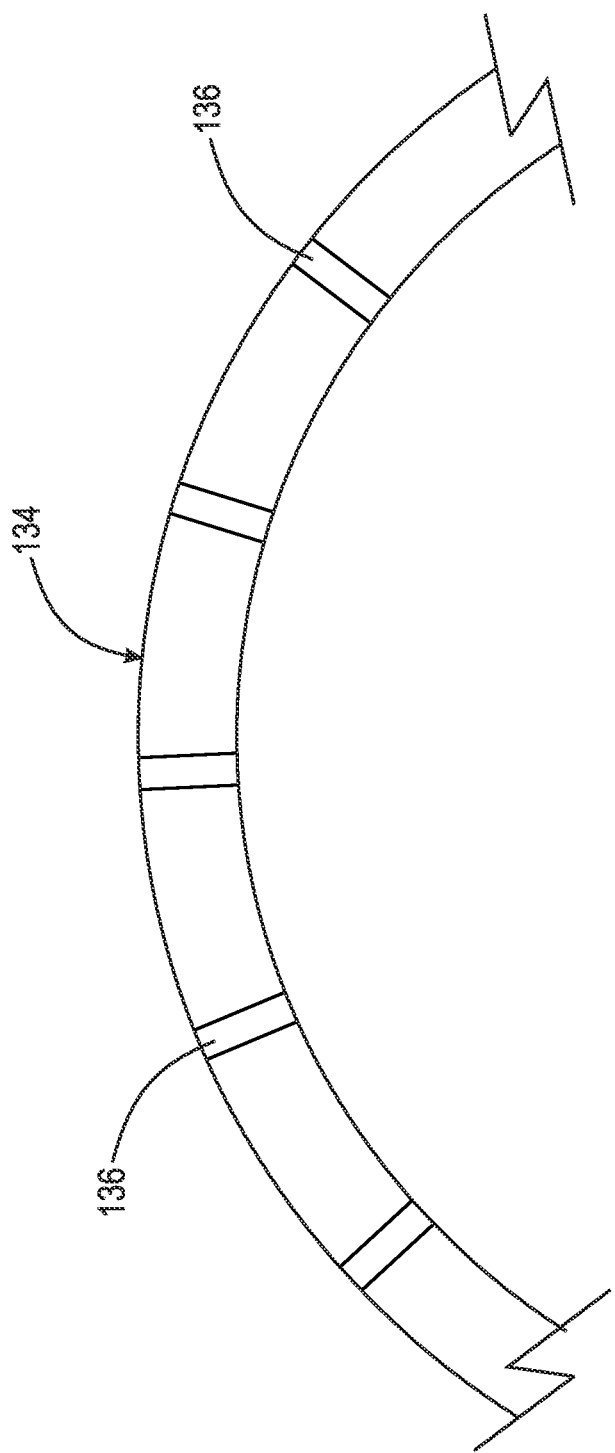
FIG. 4 is a front view detail of friction material shown in FIG. 1.

FIG. 4 is a front view detail of friction material 134 shown in FIG. 1. Lock-up clutch 110 includes friction material 134: axially disposed between cover 104 and piston plate 120; located radially outward of flow control assembly 102; including at least one slot 136; and arranged to non-rotatably connect to cover 104 and piston plate 120 in the clutch closed mode.

Cover 104, friction material 134, piston plate 120, and flow control assembly 102 define, at least in part: portion 138 of apply pressure chamber 130. Cover 104, impeller shell 112, piston plate 120, and friction material 134 define, at least in part, portion 140 of apply pressure chamber 130. In the clutch open mode, fluid F is arranged to flow: from release pressure chamber 128; through through-bore 127; through gap 141 between seal 122 and cover 104; and into portion 138. In the clutch open mode, flow control assembly enables flow of fluid F through through-bore 127 and gap 141 to cool torus 132, while providing the structure and functionality described above and below for the clutch closed mode and the transition from the clutch open mode to the clutch closed mode.

In the clutch closed mode, fluid F is arranged to flow: from portion 140; through at least one slot 136; through portion 138, through flow control assembly 102, and into release pressure chamber 128. In particular, fluid F is arranged to flow through through-bore 127. In the clutch closed mode, flow control assembly 102 is arranged to reduce the fluid pressure of fluid F flowing from portion 138 into release pressure chamber 128. For example, flowing fluid F through through-bore 127 constricts the flow from portion 138 into release pressure chamber 128 and reduces the pressure of fluid F flowing through through-bore 127 and into release pressure chamber 128.

In an example embodiment, plate 126 and seal 122 are preloaded to urge lip 142 of seal 122 in axial direction AD1. In an example embodiment, plate 126 or seal 122 is preloaded to urge lip 142 of seal 122 in axial direction AD1.

Fluid pressure in portion 138 combines with any preloading of plate 126 and/or seal 122 to generate force FC1 urging plate 126 and lip 142 in direction AD1 and into contact with cover 104. Fluid pressure in release pressure chamber 128 generates force FC2, opposite force FC1, urging seal 122 in axial direction AD2, opposite direction AD1. Thus, seal 122 is in contact with and sealed against cover 104 when force FC1 is greater than force FC2. Seal 124 is sealed against piston plate 120 for both the clutch open mode and the clutch closed mode. Seal 124 remains sealed against piston plate 120 when piston plate is displaced in directions AD1 and AD2 to shift between the clutch open and clutch closed modes.

A minimum fluid pressure differential between pressure chambers is needed to transition from a clutch open mode to a clutch closed mode of a lock-up clutch in a torque converter. An unregulated flow of fluid from a pressure apply chamber to a pressure release chamber of the lock-up clutch can hamper creation of the pressure differential. For example, if flow control assembly 102 is removed from torque converter 100, at the start of the transition from the clutch open mode to the clutch closed mode, fluid F would flow too rapidly into chamber 128, pressurizing chamber 128 and causing a fluid pressure equilibrium, rather than a fluid pressure differential, between chamber 128 and chamber 130 before gap 143, between piston plate 120 and friction material 134, is narrowed enough to reduce the flow of fluid F into chamber 128. This problem is exacerbated if piston plate 120 is displaced to a full extent in direction AD2 (gap 143 is maximized) at the start of the transition from the clutch open mode to the clutch closed mode. The absence of, or delay in forming, the fluid pressure differential between chambers 128 and 130 would interfere with a predictable, repeatable, and controlled transition to the clutch closed mode.

In torque converter 100, for the transition from the clutch open mode to the clutch closed mode, flow control assembly 102 provides a controlled flow of fluid F from chamber 130 into chamber 128, such that pressure in release pressure chamber 128 remains low enough to ensure an optimal fluid pressure differential between chambers 128 and 130, and to ensure a predictable, repeatable, and controlled transition to the clutch closed mode. In addition, the flow of fluid F through from portion 138 through-bore 127 into release pressure chamber 128 prevents excessive fluid pressure build-up in portion 138 and provides a cooling flow for clutch 110.

The following discussion presents example pressures solely for the purpose of illustrating transitions between the clutch open mode and the clutch closed mode. It is understood that torque converter 100 is not limited to these pressures and that other pressures are possible in torque converter 100. The transition from the clutch open mode to the clutch closed mode occurs substantially as follows:

1. Starting from FIG. 2 (torque converter 100 is in a steady state clutch open mode) fluid F flows through channel CH1 of input shaft IS into chamber 128. Fluid pressure in release pressure chamber 128 is 8 bar and fluid pressure in chamber 130 is 7 bar.
2. Chamber 128 is depressurized to approximately zero bar by reversing the flow of fluid F from CH1. Fluid F flows into apply pressure chamber 130 from channel CH2, formed by input shaft IS and stator shaft SS.
3. Fluid F flows from portion 140 through gap 143 with little resistance into portion 138.
4. Gap 143 remains open. Force FC1 closes gap 141. Flow of fluid F from portion 138 into release pressure chamber 128 is constricted by through-bore 127. Fluid pressure build-up in release pressure chamber 128 is minimized by the constricted flow through through-bore 127, creating the fluid pressure differential between chambers 128 and 130 needed to close clutch 110.
5. In the steady state of FIG. 3, fluid F continues to flow: from portion 140; though slots 136; through portion 138; through through-bore 127; and into release pressure chamber 128. The flow of fluid F into release pressure chamber 128 is constricted by through-bore 127, creating a fluid back pressure at the interface of portion 140 and friction material 134, which creates a maximum fluid pressure in portion 140, clamping clutch 110 closed and enabling full transmission of torque RT to output element 111. Fluid pressure in release pressure chamber 128 remains low and fluid pressure in chamber 130 is 8 bar.

Flow control assembly 102, for example force FC1 and the dimensions of through-bore 127, are tuned to create and operate in selected fluid pressure ranges. For example: for the initial stage of the transition from the clutch open mode to the clutch closed mode, gap 141 is closed and through-bore 127 is sized to ensure that fluid pressure in release pressure chamber 128 remains low; and for the steady state clutch open mode, gap 141 opens to augment flow through through-bore 127 to cool torus 132.

In the example of FIG. 1: clutch 110 includes outer clutch plate 144 and leaf spring 146; and two-pass torque converter 100 includes stator 147, one-way clutch 148, and pendulum vibration damper 150. Spring 146 non-rotatably connects cover 104 and piston plate 120. Leaf spring 146 can be configured to bias piston plate 120 toward or away from cover 104. Stator 147 includes at least one stator blade 152 axially disposed between blades 114 and 118. Damper 150 includes input element 154 and output flange 156 including output element 111. Turbine shell 116 is connected to damper 150. A portion of plate 144 is axially disposed between cover 104, piston plate 120, and friction material 134. Plate 144 is non-rotatably connected to input element 154. In the clutch closed mode, torque is transmitted from cover 104 to output element 111 via plate 144 and damper 150.

Figure 5:
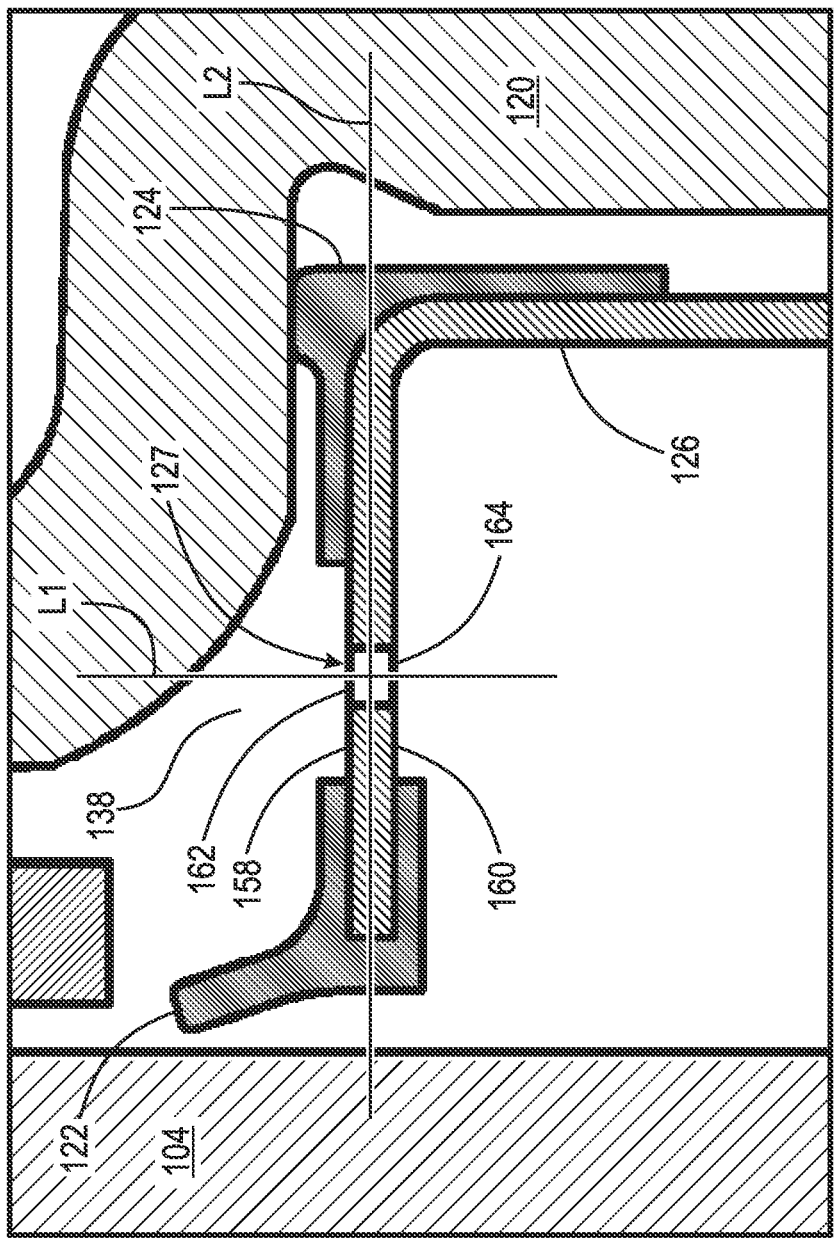
FIG. 5 is a detail of area 5 in FIG. 1.

FIG. 5 is a detail of area 5 in FIG. 1. In the example of FIG. 1, seal plate 126 includes: surface 158 facing in radially outer direction RD1, orthogonal to an axis of rotation AR; surface 160 facing in radially inner direction RD2, opposite radial direction RD1. Surface 158 defines end 162 of through-bore 127 and surface 160 defines end 164 of through-bore 127. Line L1, passes through in sequence and in direction RD2: piston plate 120; portion 138; end 162;

through-bore 127; end 164; and chamber 128 without passing through another component of torque converter 100. Line L2, in direction AD2, passes through: seal 122; through-bore 127; and seal 124.

Figure 6:
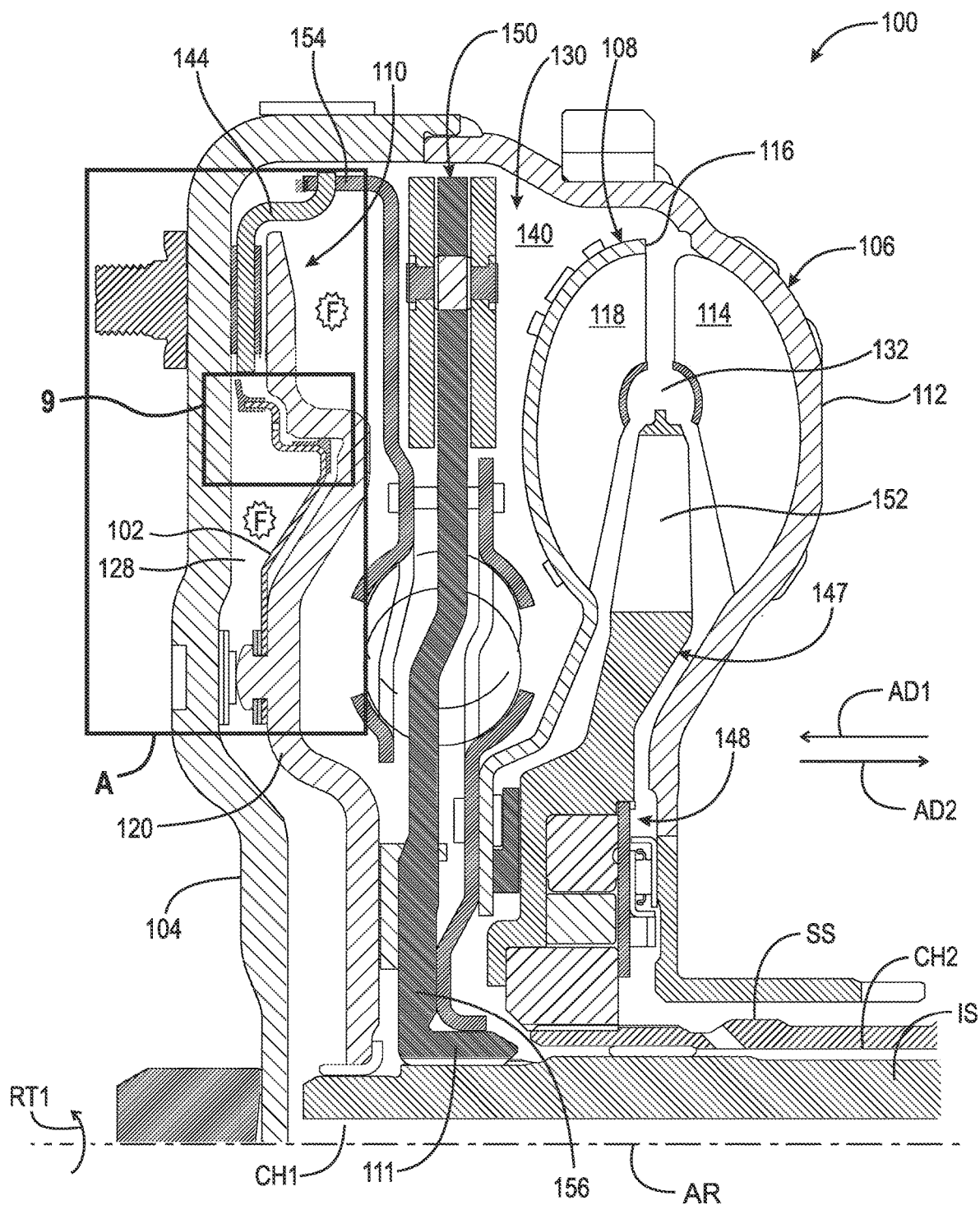
FIG. 6 is a partial cross-sectional view of a two-pass torque converter, with a flow control assembly, in the clutch open mode.

FIG. 6 is a partial cross-sectional view of two-pass torque converter 100, with flow control assembly 102, in the clutch open mode.

Figure 7:
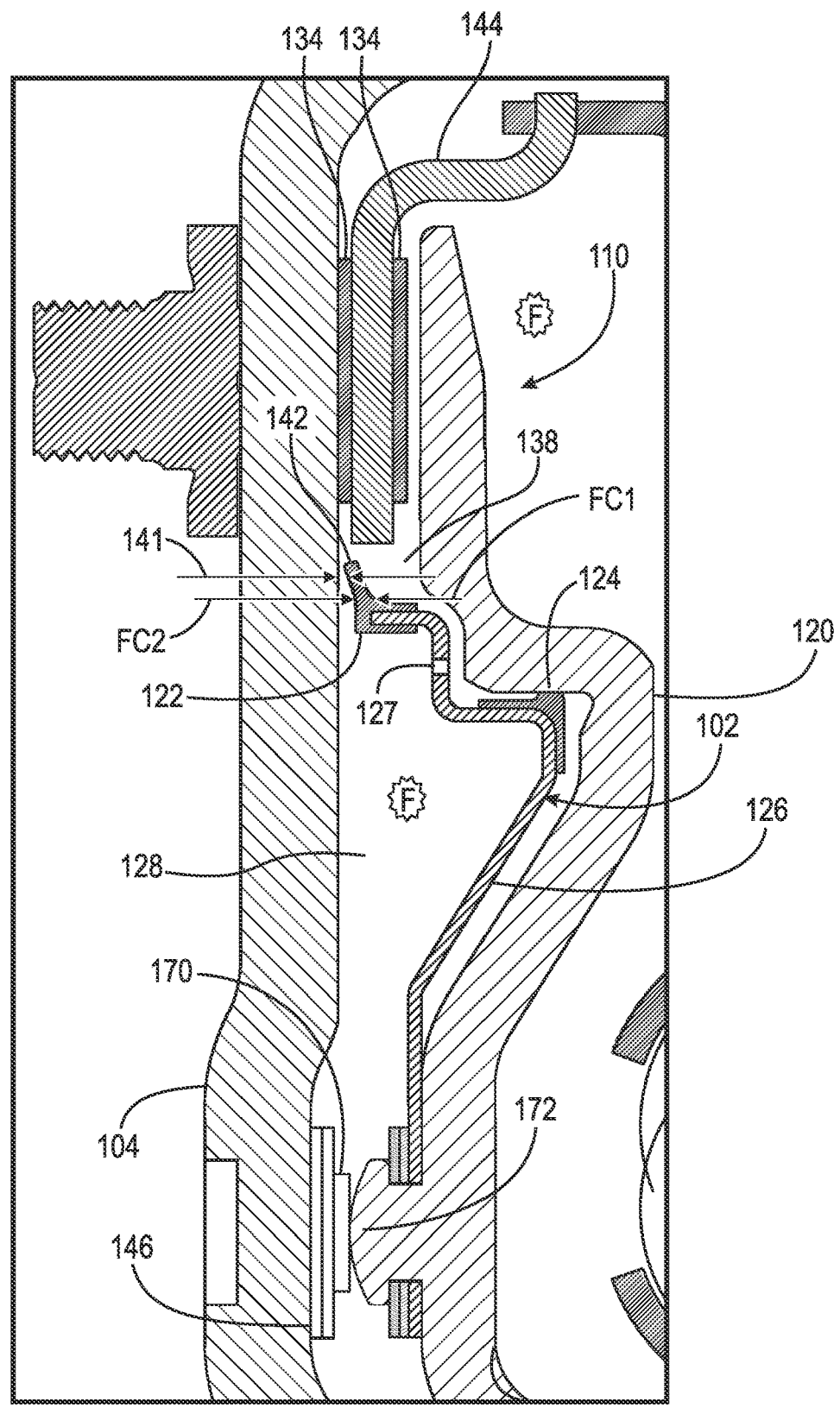
FIG. 7 is a detail of area A in FIG. 6.

FIG. 7 is a detail of area A in FIG. 6.

Figure 8:
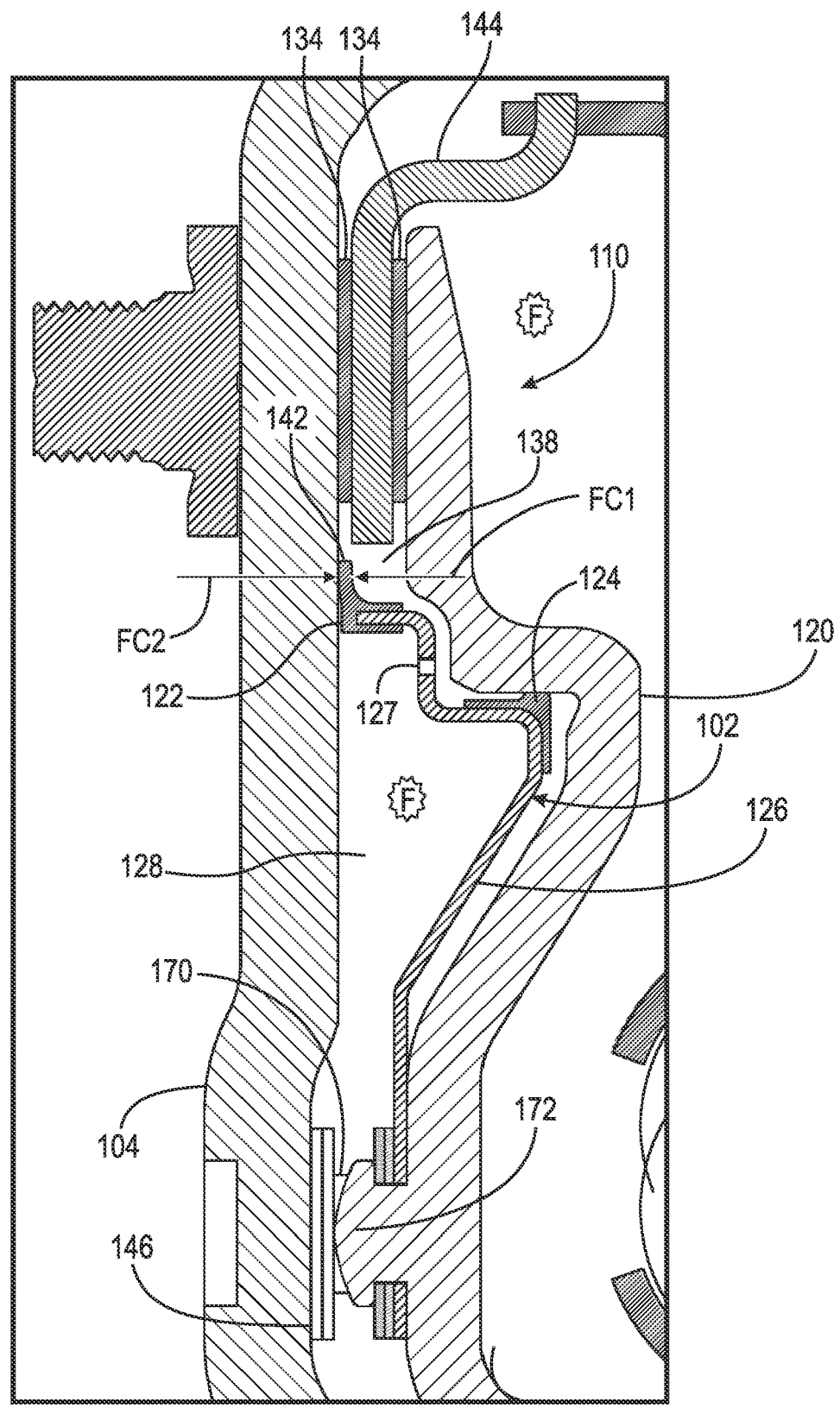
FIG. 8 is a detail of area A in FIG. 6 with the two-pass torque converter in the clutch closed mode.

FIG. 8 is a detail of area A in FIG. 6 with two-pass torque converter 100 in the clutch closed mode.

Figure 9:
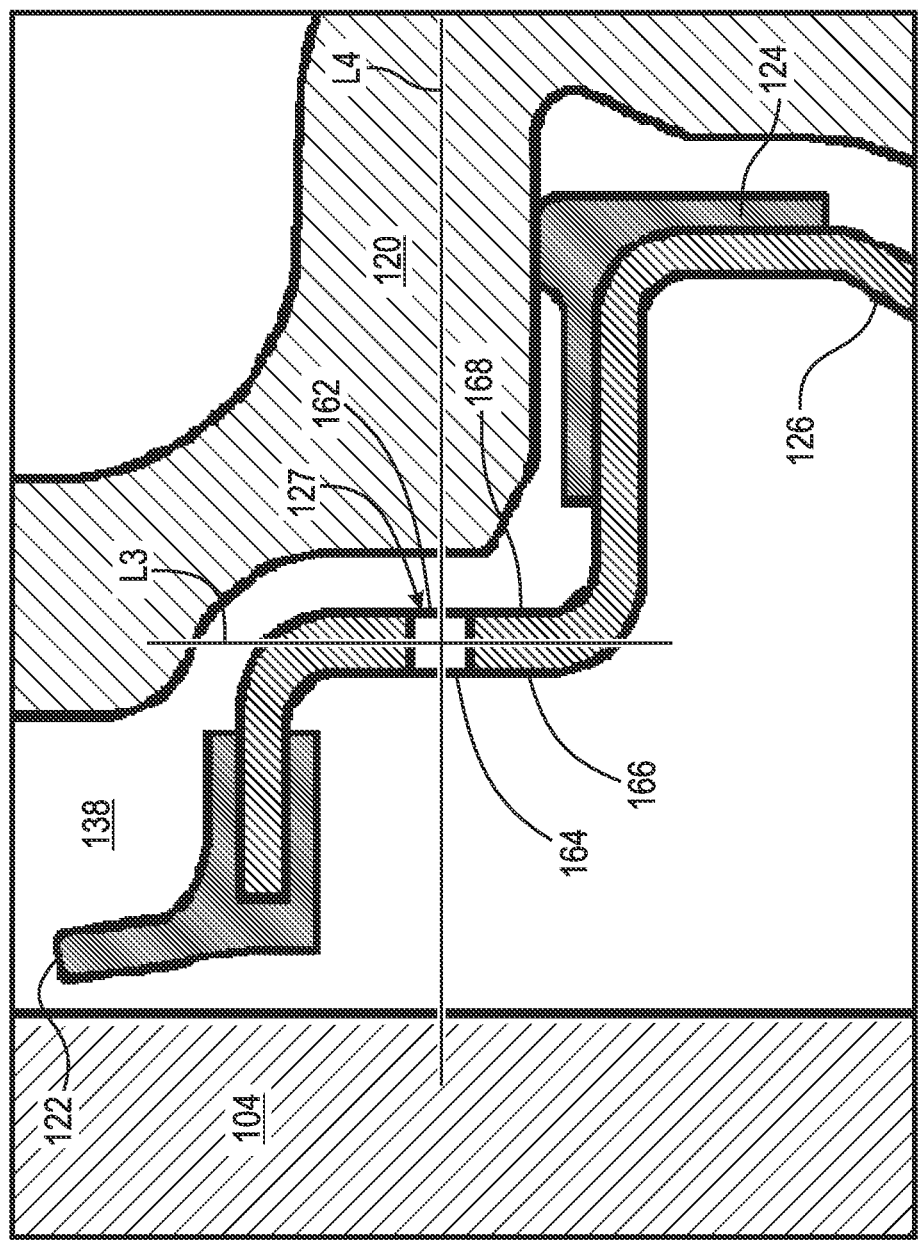
FIG. 9 is a detail of area 9 in FIG. 6.

FIG. 9 is a detail of area 9 in FIG. 6. The following should be viewed in light of FIGS. 1 through 9. Except as noted, the discussion for two-pass torque converter 100 in FIGS. 1 through 5 is applicable to two-pass torque converter 100 in FIG. 6. In the example of FIG. 6, seal plate 126 includes: surface 166 facing in axial direction AD1; surface 168 facing in axial direction AD2. Surface 168 defines end 162 of through-bore 127 and surface 166 defines end 164 of through-bore 127. Line L3, in radial direction RD2 passes through: piston plate 120; portion 138; seal plate 126; through-bore 127; seal plate 126; and chamber 128. Line L4, passes through in sequence and in axial direction AD2: cover 104; chamber 128; end 164; through-bore 127; end 162; portion 138; and piston plate 120 without passing through another component of torque converter 100.

In FIGS. 1 and 6, leaf spring 146 is fixedly connected to cover 104 by rivet 170 and is fixedly connected to piston plate 120 by rivet 172. Rivet 172 fixedly connects seal plate 126 to piston plate 120.

Figure 10:
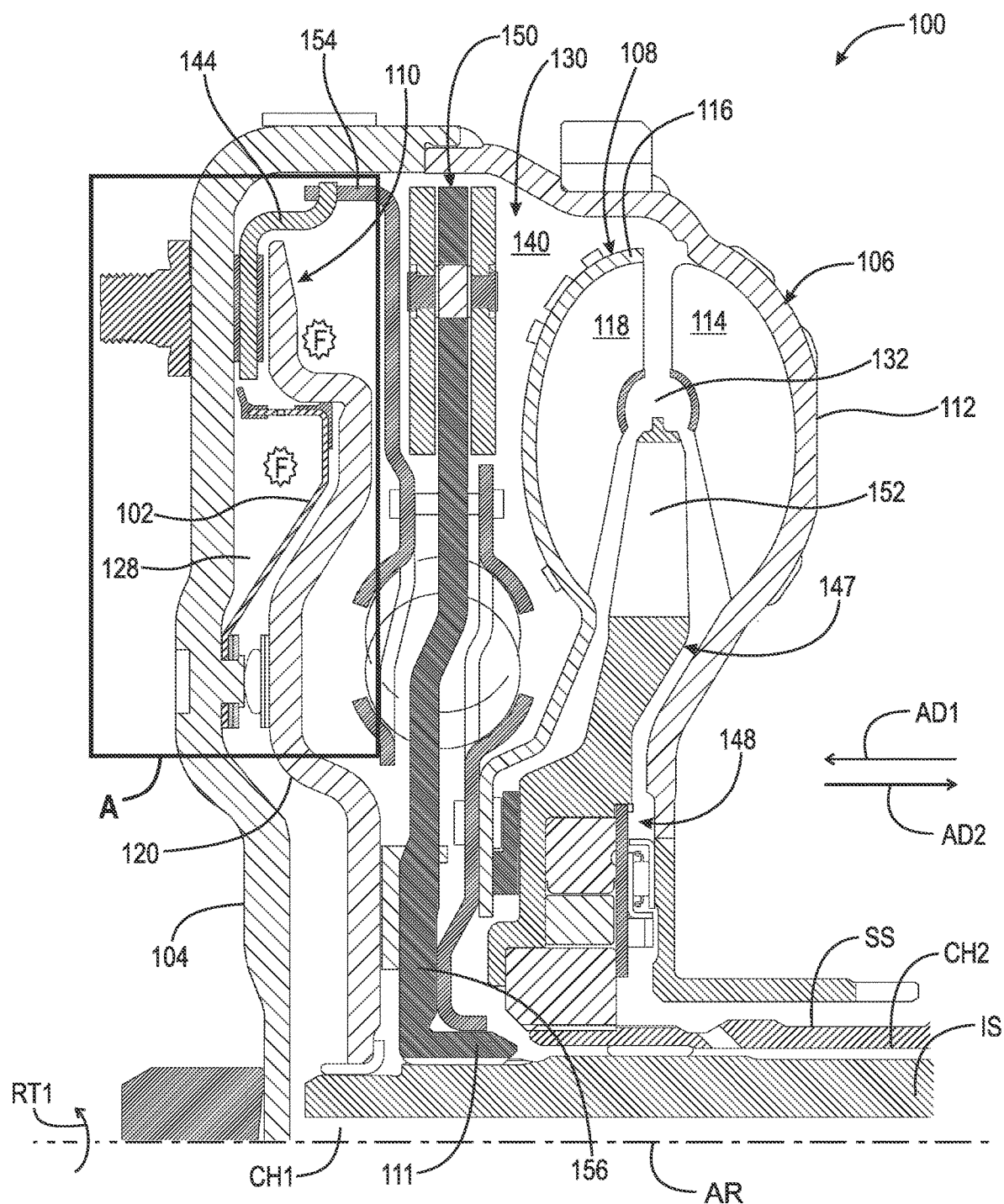
FIG. 10 is a partial cross-sectional view of a two-pass torque converter, with a flow control assembly, in the clutch open mode.

FIG. 10 is a partial cross-sectional view of two-pass torque converter 100 with a flow control assembly 102 in the clutch open mode.

Figure 11:
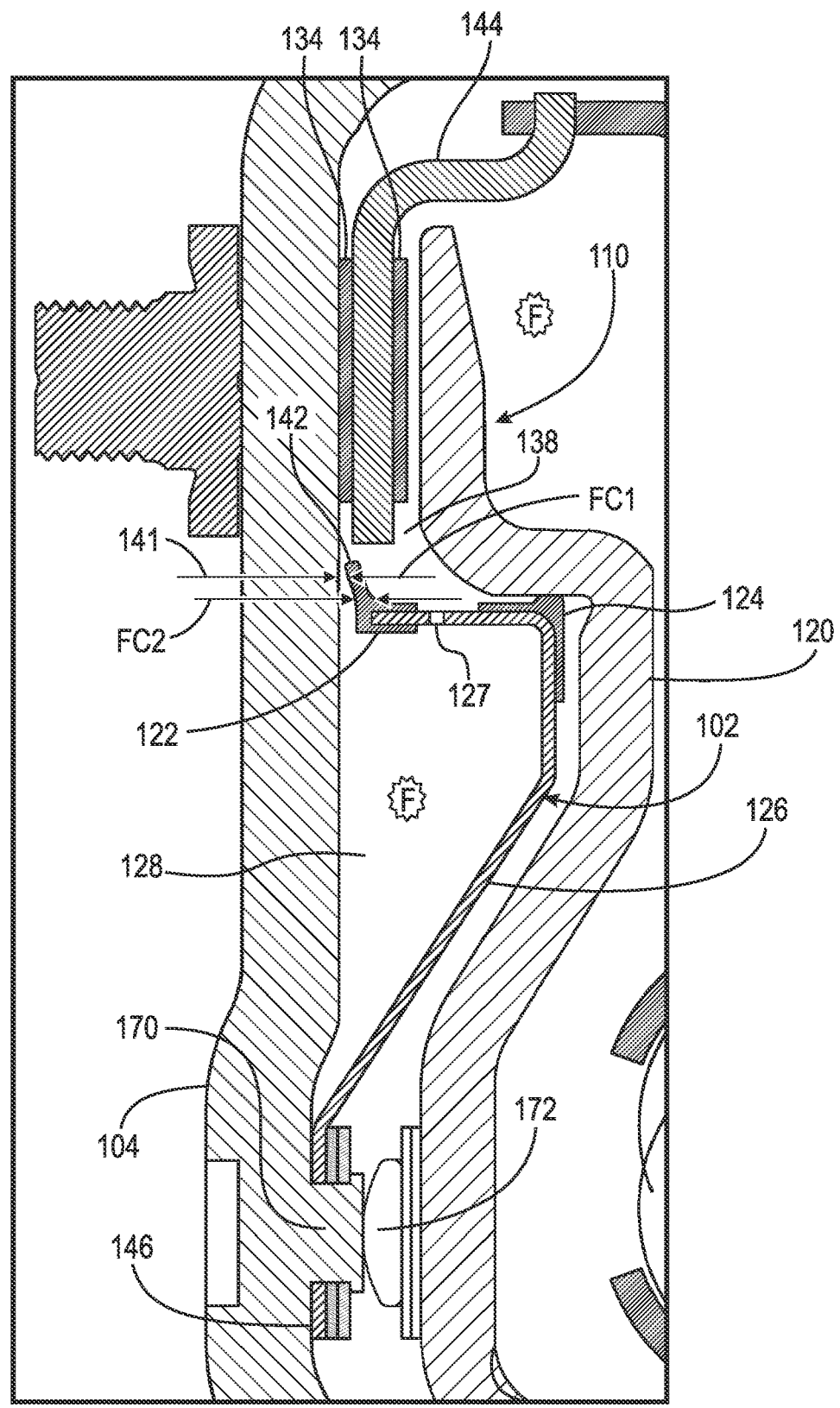
FIG. 11 is a detail of area A in FIG. 10.

FIG. 11 is a detail of area A in FIG. 10. The discussion for torque converter 100 in FIGS. 1 through 5 is applicable to torque converter 100 in FIG. 10 with the exception that seal plate 126 is fixedly connected to cover 104 by rivet 170, rather than fixedly connected to piston plate 120 by rivet 172.

Figure 12:
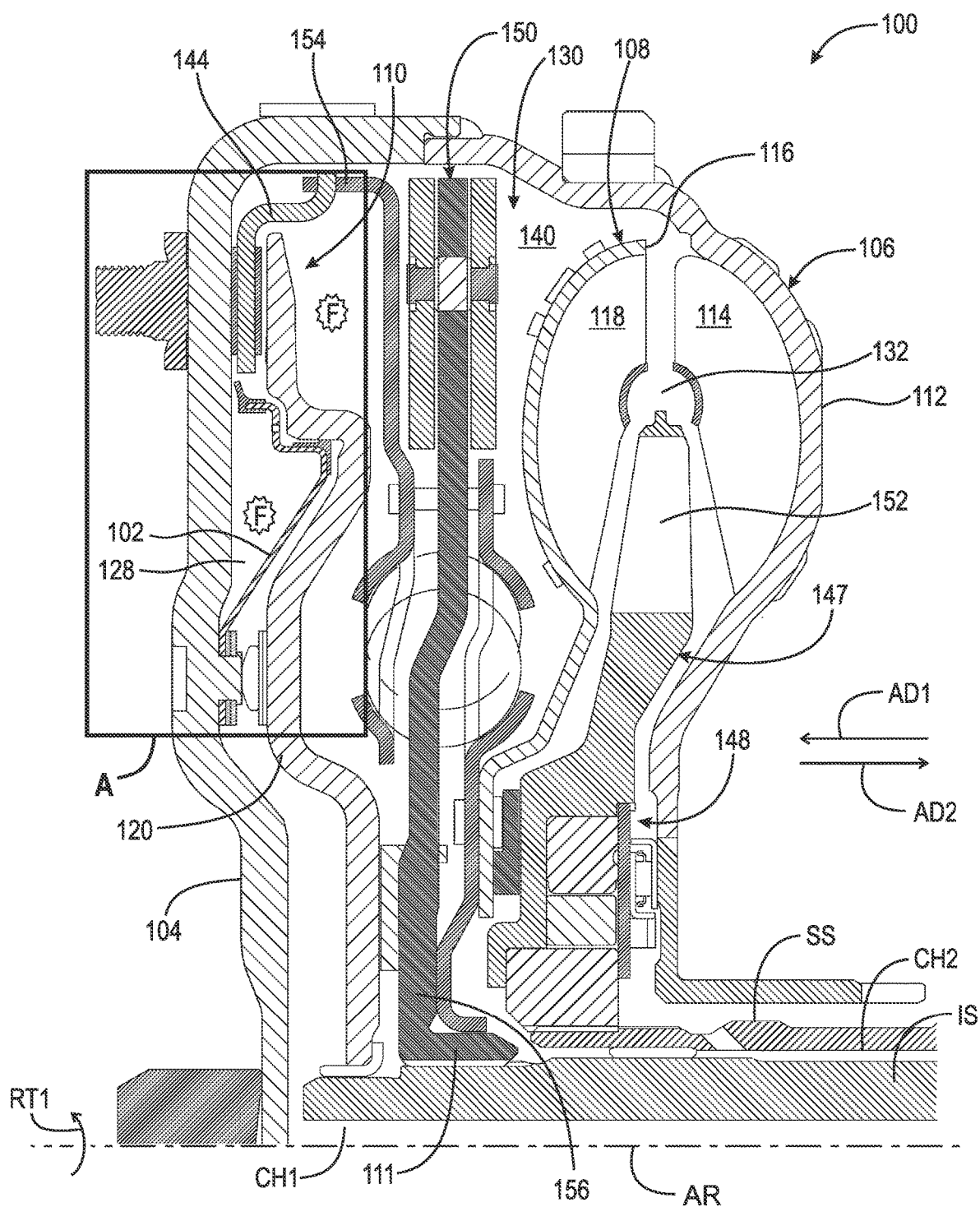
FIG. 12 is a partial cross-sectional view of a two-pass torque converter, with a flow control assembly, in the clutch open mode.

FIG. 12 is a partial cross-sectional view of two-pass torque converter 100 with flow control assembly 102 in the clutch open mode.

Figure 13:
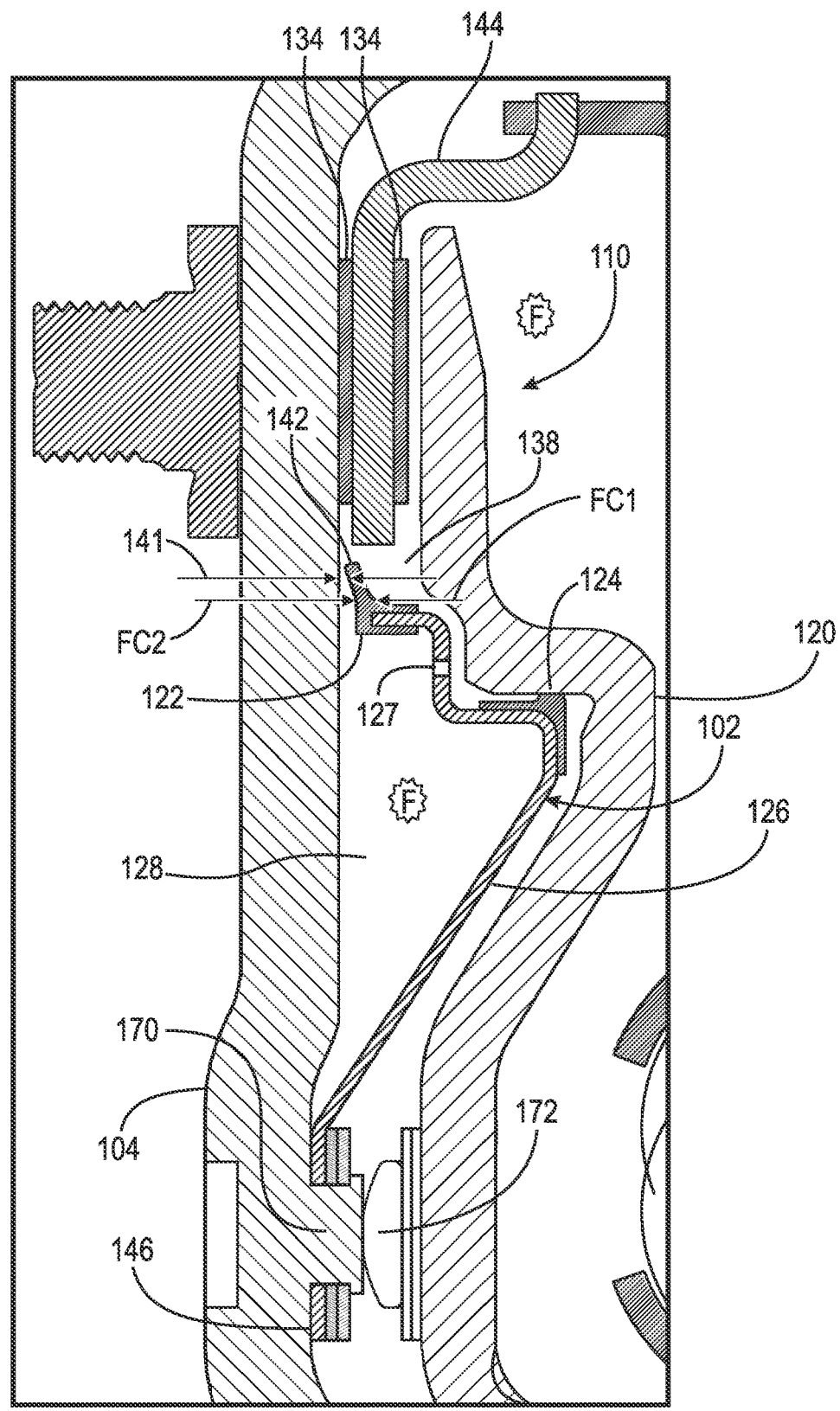
FIG. 13 is a detail of area A in FIG. 12.

FIG. 13 is a detail of area A in FIG. 12. The discussion for torque converter 100 in FIGS. 6 through 9 is applicable to torque converter 100 in FIG. 12 with the exception that seal plate 126 is fixedly connected to cover 104 by rivet 170, rather than fixedly connected to piston plate 120 by rivet 172.

The following should be viewed in light of FIGS. 1 through 13. The following describes a method of operating two-pass torque converter 100 including: flow control assembly 102; cover 104, impeller 106, turbine 108, lock-up clutch 110, and output element 111. Although the method is presented as a sequence of steps for clarity, no order should be inferred from the sequence unless explicitly stated. A first step receives, with cover 104, rotational torque RT. For the clutch open mode, a second step: urges piston plate 120 away from cover 104 with fluid F in release pressure chamber 128; flows fluid F from release pressure chamber 128, through through-bore 127 and into apply pressure chamber 130; flows fluid F from release pressure chamber 128 between seal 122 and cover 104 and into apply pressure chamber 130; and transmits rotational torque RT from cover 104 to the output element 111 via impeller 106 and turbine 108. For the clutch closed mode, a third step: urges piston plate 120 toward cover 104 with fluid F in apply pressure chamber 130; flows fluid F in apply pressure chamber 130 from apply pressure chamber 130 through through-bore 127 and into release pressure chamber 128; and transmits rotational torque RT from cover 104 to output element 111 via lock-up clutch 110.

For the clutch open mode, a fourth step: seals second seal 124 against piston plate 120; and blocks, with seal 124, a flow of fluid F, in release pressure chamber 128, between seal 124 and piston plate 120 and into apply pressure chamber 130.

For the clutch closed mode, a fifth step: holds, with fluid F in apply pressure chamber 130, seal 122 against cover 104; blocks, with seal 122, a flow of fluid F, in apply pressure chamber 130, between seal 122 and cover 104 and into release pressure chamber 128; seals seal 124 against piston plate 120; and blocks, with seal 124, a flow of fluid F, in apply pressure chamber 130, between seal 124 and piston plate 120 and into release pressure chamber 128.

For the transition from the clutch open mode to the clutch closed mode, torque converter 100 with flow control assembly 102, and a method of using torque converter 100 with flow control assembly 102, provide a controlled, repeatable, and restricted flow of fluid F from chamber 130 into chamber 128, such that the pressure differential between chambers 128 and 130 is sufficient to ensure a controlled, repeatable, and predictable displacement of piston plate 120 and transition to the clutch closed mode. In the clutch closed mode, fluid F flows through through-bore 127, preventing excessive fluid pressure build-up in portion 138, and providing cooling of clutch 110. In the clutch open mode, flow through gap 141 provides cooling of torus 132.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
AR axis of rotation
CD1 circumferential direction
CD2 circumferential direction
F fluid
FC1 force
FC2 force
FC3 force
FC4 force
IS input shaft
RD1 radial direction
RD2 radial direction
RT rotational torque
100 torque converter
102 flow control assembly
104 cover
106 impeller
108 turbine
110 lock-up clutch
111 output element
112 impeller shell
114 impeller blade
116 turbine shell
118 turbine blade
120 piston plate
122 seal 124 seal
126 seal plate
127 through-bore
128 pressure chamber
130 pressure chamber
132 torus
134 friction material
136 slot
138 portion, pressure chamber 130
140 portion, pressure chamber 130
141 gap
142 lip, seal 122
143 gap
144 clutch plate
146 leaf spring
147 stator
148 one-way clutch
150 pendulum vibration damper
152 stator blade
154 input element
156 output flange
158 surface, seal plate
160 surface, seal plate
162 end, through-bore
164 end, through-bore
166 surface, seal plate
168 surface, seal plate
170 rivet
172 rivet

The invention claimed is:

1. A two-pass torque converter, comprising:
a cover arranged to receive a rotational torque;
an impeller including:
    an impeller shell connected to the cover; and,
    at least one impeller blade fixedly connected to the impeller shell;
a turbine including:
    a turbine shell; and,
    at least one turbine blade fixedly connected to the turbine shell;
a lock-up clutch including an axially displaceable piston plate;
an output element arranged to non-rotatably connect to an input shaft of a transmission; and,
a flow control assembly including:
    a seal plate defining a through-bore;
    a first resilient seal attached to the seal plate; and,
    a second resilient seal attached to the seal plate and in contact with the axially displaceable piston plate, wherein:
the cover, the flow control assembly, and the axially displaceable piston plate define, at least partly, a release pressure chamber;
the cover, the impeller shell, the axially displaceable piston plate, the second resilient seal, the seal plate, and the first resilient seal define, at least partly, an apply pressure chamber;
in a clutch closed mode of the two-pass torque converter:
    the lock-up clutch is arranged to transmit the rotational torque to the output element; and,
    a fluid in the apply pressure chamber is arranged to flow through the through-bore and into the release pressure chamber;
a first end of the through-bore opens directly to the apply pressure chamber; and,
a second end of the through-bore opens directly to a portion of the release pressure chamber, the portion of the release pressure chamber defined, at least in part, by the cover, the first resilient seal, and the seal plate.

2. The two-pass torque converter of claim 1, wherein:
the lock-up clutch includes friction material axially disposed between the cover and the axially displaceable piston plate;
the cover, the friction material, the axially displaceable piston plate, and the flow control assembly define, at least partly, a first portion of the apply pressure chamber;
the cover, the impeller shell, the axially displaceable piston plate, and the friction material define, at least partly, a second portion of the apply pressure chamber; and,
in the clutch closed mode, the fluid in the apply pressure chamber is arranged to flow from the second portion of the apply pressure chamber, through the first portion of the apply pressure chamber, and through the through-bore.

3. The two-pass torque converter of claim 1, wherein in the clutch closed mode:
the fluid in the apply pressure chamber is arranged to urge the first resilient seal into contact with the cover; and,
the first resilient seal is arranged to block a flow of the fluid, in the apply pressure chamber, between the first resilient seal and the cover and into the portion of the release pressure chamber.

4. The two-pass torque converter of claim 3, wherein:
the second resilient seal is sealed against the axially displaceable piston plate;
in the clutch closed mode, the second resilient seal is arranged to block a flow of the fluid in the apply pressure chamber between the second resilient seal and the axially displaceable piston plate and into a second portion of the release pressure chamber; and,
the second portion of the release pressure chamber is defined, at least in part, by the axially displaceable piston plate, the second resilient seal, and the seal plate.

5. The two-pass torque converter of claim 4, wherein the portion of the release pressure chamber and the second portion of the release pressure chamber do not overlap.

6. The two-pass torque converter of claim 1, wherein in a clutch open mode of the two-pass torque converter:
the impeller is arranged to transmit the rotational torque to the output element;
the fluid in a portion of the release pressure chamber is arranged to flow between the first resilient seal and the cover and into the apply pressure chamber;
the fluid in the portion of the release pressure chamber is arranged to flow through the A through-bore and into the apply pressure chamber.

7. The two-pass torque converter of claim 1, wherein in a clutch open mode of the two-pass torque converter:
the impeller is arranged to transmit the rotational torque to the output element;
the fluid in the portion of the release pressure chamber is arranged to flow through the through-bore and into the apply pressure chamber.

8. The two-pass torque converter of claim 1, wherein:
for the clutch closed mode, the second resilient seal is arranged to block a flow of the fluid, in the apply pressure chamber, between the second resilient seal and the axially displaceable piston plate and into a second portion of the release pressure chamber; and,
the second portion of the release pressure chamber is defined, at least in part, by the axially displaceable piston plate, the second resilient seal, and the seal plate.

9. The two-pass torque converter of claim 1, wherein:
in the clutch closed mode:
the fluid in the apply pressure chamber is arranged to urge the first resilient seal into contact with the cover; and,
the first resilient seal is arranged to block flow of the fluid, in the apply pressure chamber, between the first resilient seal and the cover and into the portion of the release pressure chamber; and,
in a clutch open mode of the two-pass torque converter:
the impeller is arranged to transmit the rotational torque to the output element;
the fluid in the portion of the release pressure chamber is arranged to urge the first resilient seal out of contact with the cover; and,
the fluid in the portion of the release pressure chamber is arranged to flow between the first resilient seal and the cover and into the apply pressure chamber.

10. The two-pass torque converter of claim 9, wherein:
for the clutch closed mode, the second resilient seal blocks a flow of the fluid, in the apply pressure chamber, between the second resilient seal and the axially displaceable piston plate and into a second portion of the release pressure chamber;
the second portion of the release pressure chamber is defined, at least in part, by the axially displaceable piston plate, the second resilient seal, and the seal plate; and,
for the clutch open mode, the second resilient seal blocks a flow of the fluid, in the second portion of the release pressure chamber, between the second resilient seal and the axially displaceable piston plate and into the apply pressure chamber.

11. The two-pass torque converter of claim 10, wherein the portion of the release pressure chamber and the second portion of the release pressure chamber do not overlap.

12. The two-pass torque converter of claim 1, wherein:
a line orthogonal to an axis of rotation of the two-pass torque converter passes through in sequence: the apply pressure chamber, the through-bore, and the portion of the release pressure chamber without intersecting the seal plate.

13. The two-pass torque converter of claim 1, wherein a line parallel to an axis of rotation of the two-pass torque converter passes through in sequence: the seal plate, the through-bore, and the seal plate.

14. The two-pass torque converter of claim 1, wherein an entirety of the second resilient seal is radially offset from the first resilient seal, or an entirety of the second resilient seal is axially offset from the first resilient seal.

15. A two-pass torque converter, comprising:
a cover arranged to receive rotational torque;
an impeller including:
an impeller shell connected to the cover; and,
at least one impeller blade fixedly connected to the impeller shell;
a turbine including:
a turbine shell; and,
at least one turbine blade fixedly connected to the turbine shell;
a lock-up clutch including a piston plate;
an output element arranged to non-rotatably connect to an input shaft of a transmission; and,
a flow control assembly including:
a seal plate defining a through-bore;
a first resilient seal connected to the seal plate; and,
a second resilient seal attached to the seal plate and in contact with the piston plate, wherein:
the cover, the first resilient seal, and the seal plate define, at least partly, a first portion of a release pressure chamber;
the piston plate, the second resilient seal, and the seal plate define, at least partly, a second portion of the release pressure chamber;
the cover, the impeller shell, the piston plate, and the flow control assembly define, at least partly, an apply pressure chamber;
in a clutch closed mode of the two-pass torque converter:
the lock-up clutch is arranged to transmit the rotational torque to the output element; and,
a fluid in the apply pressure chamber is arranged to flow through the through-bore and into the first portion of the release pressure chamber;
in a clutch open mode:
the impeller is arranged to transmit the rotational torque to the output element;
the fluid in the first portion of the release pressure chamber is arranged to flow through the through-bore and into the apply pressure chamber; and,
the fluid in the first portion of the release pressure chamber is arranged to flow between the first resilient seal and the cover and into the apply pressure chamber;
in the clutch closed mode:
the fluid in the apply pressure chamber is arranged to hold the first resilient seal in contact with the cover;
the first resilient seal is arranged to block flow of the fluid, in the apply pressure chamber, between the first resilient seal and the cover and into the first portion of the release pressure chamber; and,
the second resilient seal is arranged to block flow of the fluid, in the apply pressure chamber, between the second resilient seal and the piston plate and into a second portion of the release pressure chamber;
the second portion of the release pressure chamber is defined, at least in part, by the piston plate, the second resilient seal, and the seal plate; and,
in the clutch open mode, the second resilient seal is arranged to block a flow of the fluid, in the second portion of the release pressure chamber, between the second resilient seal and the piston plate and into the apply pressure chamber.

16. A method of operating a two-pass torque converter including a cover arranged to receive torque, an impeller including an impeller shell, a turbine, a lock-up clutch including a piston plate and friction material axially disposed between the cover and the piston plate, an output element, and a flow control assembly including a seal plate, a first resilient seal connected to the seal plate, and a second resilient seal connected to the seal plate, the seal plate defining a through-bore, the method comprising:
receiving, with the cover, a rotational torque;
for a clutch open mode:
urging the piston plate away from the cover with a fluid in a first portion of a release pressure chamber, the first portion of the release pressure chamber defined at least in part by the cover, the first resilient seal, and the seal plate;
flowing the fluid in the first portion of the release pressure chamber through the through-bore and into an apply pressure chamber, the apply pressure chamber defined at least in part by the cover, the impeller shell, the piston plate, and the flow control assembly;

flowing the fluid, in the first portion of the release pressure chamber, between the first resilient seal and the cover and into the apply pressure chamber;

blocking, with the second resilient seal, flow of the fluid from a second portion of the release pressure chamber into the apply pressure chamber, the second portion of the release pressure chamber defined, at least in part, by the piston plate, the second resilient seal, and the seal plate; and, transmitting the rotational torque from the cover to the output element via the impeller and the turbine; and, for a clutch closed mode:

urging the piston plate toward the cover with the fluid in the apply pressure chamber;

flowing the fluid in the apply pressure chamber through the through-bore and into the first portion of the release pressure chamber;

blocking, with the second resilient seal, flow of the fluid from the apply pressure chamber into the second portion of the release pressure chamber; and, transmitting the rotational torque from the cover to the output element via the lock-up clutch.

17. The method of claim 16, further comprising:
for the clutch open mode sealing the second resilient seal against the piston plate.

18. The method of claim 16, further comprising:
for the clutch closed mode:

holding, with the fluid in the apply pressure chamber, the first resilient seal against the cover;

blocking, with the first resilient seal, a flow of the fluid, in the apply pressure chamber, between the first resilient seal and the cover and into the first portion of the release pressure chamber;

sealing the second resilient seal against the piston plate; and, blocking, with the second resilient seal, a flow of the fluid, in the apply pressure chamber, between the second resilient seal and the piston plate and into the second portion of the release pressure chamber.

\* \* \* \* \*